(12) United States Patent  
Haldemann et al.

(10) Patent No.: US 7,872,392 B2
(45) Date of Patent: Jan. 18, 2011

(54) ROTATING ELECTRICAL MACHINE

(75) Inventors: Johann Haldemann, Birr (CH); Reinhard Joho, Rombach (CH)

(73) Assignee: ALSTOM Technology Ltd., Baden (CH)

( * ) Notice: Subject to any disclaimer, the term of this patent is extended or adjusted under 35 U.S.C. 154(b) by 389 days.

(21) Appl. No.: 11/623,790

(22) Filed: Jan. 17, 2007

(65) Prior Publication Data
US 2007/0170806 A1 Jul. 26, 2007

(30) Foreign Application Priority Data
Jan. 24, 2006 (CH) .................. 0109/06

(51) Int. Cl.
H02K 1/06 (2006.01)
H02K 1/12 (2006.01)
(52) U.S. Cl. .................. 310/216.045; 310/254.1; 310/260; 310/65
(58) Field of Classification Search .............. 310/216, 310/216.045, 254.1
See application file for complete search history.

(56) References Cited
U.S. PATENT DOCUMENTS

| 662,928 | A | * | 12/1900 | Geisenhoner | ............... 310/65 |
| 3,435,262 | A | | 3/1969 | Bennett et al. | |
| 4,208,597 | A | | 6/1980 | Mulach et al. | |
| 4,217,511 | A | | 8/1980 | King, Jr. et al. | |
| 4,542,313 | A | * | 9/1985 | Di Pietro | ............... 310/65 |
| 5,894,182 | A | * | 4/1999 | Saban et al. | ............... 310/217 |
| 6,346,755 | B1 | | 2/2002 | Tong et al. | |
| 6,777,848 | B1 | * | 8/2004 | Joho et al. | ............ 310/216.043 |
| 2005/0253475 | A1 | * | 11/2005 | Cervenka et al. | ............ 310/216 |

FOREIGN PATENT DOCUMENTS

| DE | 1078681 | 3/1960 |
| DE | 2924037 | 12/1979 |
| DE | 3334501 | 3/1984 |
| EP | 0155405 | 9/1985 |
| JP | 56006635 | 1/1981 |

OTHER PUBLICATIONS

Search Report for Swiss App. No. 109/2006 (Apr. 25, 2006).
"Erfolgreiche Nachrüstung eines 970 MVA Turbogenerators" [Successful modification of a 970 MVA turbogenerator], ABB Review, Mar. 1988, pp. 3-10 (ABB, Baden, Switzerland).
Search Report for European Patent App. No. 07100523.5 (Apr. 4, 2007).

* cited by examiner

*Primary Examiner*—Quyen Leung
*Assistant Examiner*—Alex W Mok
(74) *Attorney, Agent, or Firm*—Cermak Nakajima LLP; Adam J. Cermak

(57) ABSTRACT

A rotating electrical machine, especially a turbogenerator, includes a rotor and a stator, which concentrically surrounds the rotor and is terminated at each of the two axial ends by a laminated press plate (14), which is constructed from a stack of individual press plate laminates (30). The electrical properties are improved by providing the press plate laminates (30) at least partially with slits (26) for reducing the eddy current losses.

24 Claims, 6 Drawing Sheets

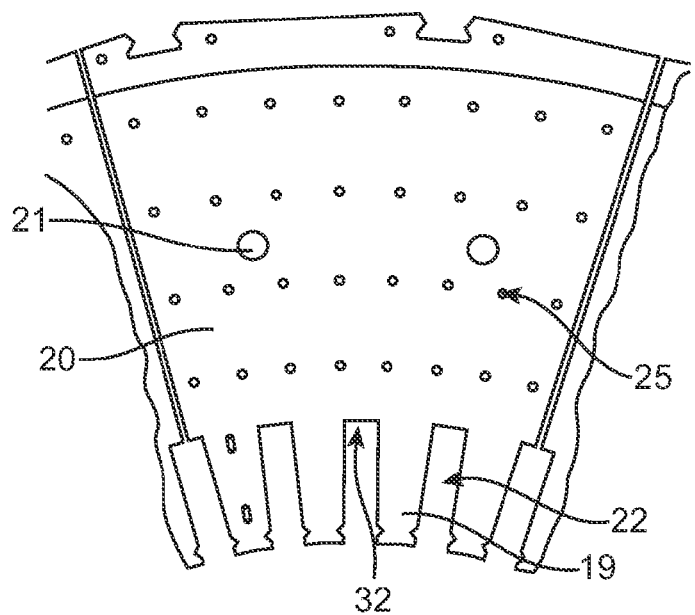
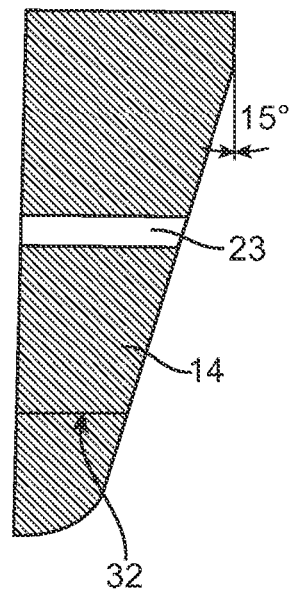
FIG. 3(a)
(Prior Art)
FIG. 3(b)
(Prior Art)
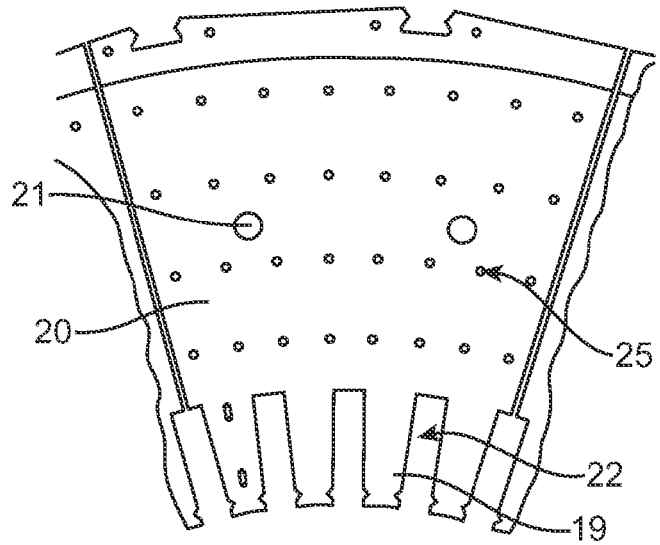
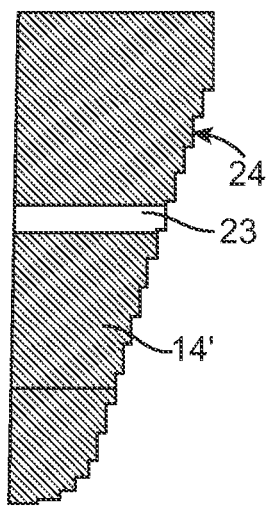
FIG. 4(a)
(Prior Art)
FIG. 4(b)
(Prior Art)

ROTATING ELECTRICAL MACHINE

This application claims priority to Swiss application number 00109/06, filed 24 Jan. 2006, the entirety of which is incorporated by reference herein.

BACKGROUND OF THE INVENTION

1. Field of the Invention

The present invention relates to the field of electrical machines and to a rotating electrical machine.

2. Brief Description of the Related Art

Laminated press plates have long been used in large turbogenerators with $H_2/H_2O$ cooling (see, for example, "Erfolgreiche Nachrüstung eines 970 MVA Turbogenerators" [Successful modification of a 970 MVA turbogenerator], ABB Review 3/1988, pages 3 et seq.). The exemplary arrangement of such a press plate is reproduced in FIG. 1. FIG. 1 shows a detail of one end of a turbogenerator 10, which includes a central rotor 11 and a stator 12, which concentrically surrounds the rotor. The stator 12 has a laminated stator core 13, which is terminated at the two axial ends by laminated press plates 14. The press plates 14 are pressed against the laminated stator core 13 in the axial direction by means of clamping bolts 16 and press fingers 15, which are arranged distributed over the circumference. The function of the press plates 14 is, firstly, the introduction of an axial force of pressure on the laminated stator core 13 both in the yoke region JB and in the tooth region ZB, which is located on the inner circumference of the laminated stator core 13 and accommodates the stator winding, of which the end-side stator end winding 17 can be seen in FIG. 1 (the rotor 11 has a corresponding rotor end winding 17a). Secondly, the press plate 14 is provided for the low-loss guidance of part of the front stator magnetic field (see the magnetic lines of force 18 in FIG. 1).

The above-described laminated press plate (14 in FIG. 1) includes individual press plate laminates of the same quality and the same laminate section as the normal stator laminates. Such press plate laminates 20, which have the form of a ring sector and have radial slots 22 or teeth 19 for accommodating the stator winding bars on the inner circumference and can be equipped with first holes 21, which form a bore 23 for the clamping bolts in the press plate, and second holes 25 for forming axial cooling channels, are illustrated in FIGS. 3 and 4. With the conically extended press plate, in order to achieve a cone angle δ, preferably in the region of 15-20°, the laminates are punched back or recently completely cut by a laser beam in layers (FIG. 3b) or blocks (press plate 14', FIG. 4b; block step 24). As in the laminated core, the press plate laminates 20 are also in overlapping layers in the press plate 14 or 14'.

All the laminates of the laminated press plate 14, 14' have the conventional laminate insulation used for the laminates of the laminated stator core. The laminates of the press plate, in a last step of the press plate production, are adhesively bonded, under pressure, to form a ring. Such adhesive bonding can take place, for example, in a furnace of a total-immersion impregnation unit (global VPI). However, the laminates can also be coated with a baked enamel (B-stage resin) and are adhesively bonded to one another under pressure and heat. The press plate thus produced is absolutely free of shorts beneath the laminate segments.

Usually, prestressed clamping bolts (16 in FIG. 1) are provided in the yoke center over the entire circumference, which clamping bolts are supported in the press plates and thus hold the laminated core such that it is permanently pressed between the press plates.

The magnetic leakage field of the stator and rotor end winding (17 and 17a, respectively, in FIG. 1) is drawn in by the magnetic press plate and in the process enters the press plate normal to the cone (lines of force 18 in FIG. 1). Under ideal conditions, the incoming magnetic flux (xx in FIG. 1) is transferred proportionally in each laminate and deflected outwards in the radial direction and in the circumferential direction in the laminate (arrows in FIG. 1). The magnetic flux collects and closes in the circumferential direction over a pole pitch. The radial component of the flux corresponds to a normal component of the flux increased by a factor of $1/\sin \delta$. With a cone angle δ of, for example, 15°, the radial component is approximately four times as great. The incoming flux bends around in the circumferential direction and accumulates by further absorbing radial components. This results in magnetic saturation of the press plate in the yoke region.

At the same time, a considerable component of the air gap main field (yy in FIG. 1) is superimposed slightly deeper in the inner region of the press plate. Superimposition of the components stator end winding leakage field, rotor end winding leakage field, and main field results. This superimposition is dependent on the load and on the phase angle between the stator current and the voltage and is expressed in a rotation of the rotor (angular displacement). In a known manner, during under excited operation (stator current leads the voltage), the most severe excessive increase in the axial field on the press plate occurs. In the case of the laminated press plate, the field attempts to compensate for itself by changing to laminate layers of the press plate which lie axially deeper.

In contrast to the conventional solid press plate, the laminated press plate absorbs the incoming front flux and guides it in sequence over a pole pitch. The above described tendency towards compensating axial flux in the press plate does have disadvantages, however:

1. Since the butt joint is offset tangentially to a large extent from layer to layer of the laminates, the axial flux cannot flow in any other way than through the laminates.
2. The axial flux results in a high degree of eddy current reaction in the laminate.

The eddy current reaction can result in high temperatures. The point with the maximum load is in the slot base region of the yoke. In order to avoid over-heating owing to the incoming front field, it is a worldwide established practice to provide the teeth with a slit, which is open towards the bore, over a certain axial depth of the laminated core, if necessary (for example FIG. 4 in DE-A-29 24 037).

In limit-rating generators, heating of the laminates in the slot base region may be so severe during under-excited operation that an arching pressure builds up (yoke cold on the outside, hot on the inside), which causes adjacent laminate segments to touch one another despite an installation gap (generally of a few tenths of a millimeter) (image of the damage from the stator end part in FIG. 2), since the forces of the arching pressure are so severe that the adhesive bonds rip open and/or flow under the severe shear forces. Owing to the touching contact, electrical shorts occur which further increase the losses. Laminates can repel one another locally and, as a result, cause axial shorts. The magnetic air gap field yy (FIG. 1) of the machine will also inject a fault current into the fault location thus produced. Self-driven propagation of the fault location (core burning) may result.

DESCRIPTION OF THE INVENTION

One of numerous aspects of the present invention includes a laminated press plate on the stator of a rotating electrical machine designed such that the described disadvantages are avoided and, in particular, the eddy current losses by the axial field are reduced.

Another aspect of the present invention involves the press plate laminates, from which the laminated press plate is constructed, being provided at least partially with slits for reducing the eddy current losses. The provision of slits takes place (from the inside) at least in the yoke region of the press plate. The slits are designed such that the laminates each remain as one unit.

The following effects can thus be achieved:
1. The eddy current losses by the axial field are reduced.
2. The axial flux can be compensated for much more effectively axially beneath the laminates.
3. The mechanical partition between the laminate segments is relieved of strain in terms of expansion owing to these further "partitions". Since the slits can be designed to be almost infinitesimally narrow, a magnetic flux in the circumferential direction is barely impeded, however.

The eddy current losses are decreased for the following reason: The axial flux enters the press plate as limited flux owing to the magnetic saturation. However, limited flux has the same significance as limited electromotive force for the eddy current paths. The eddy current paths, which need to be imagined as running along the laminate contours, become longer owing to the slits (compare FIGS. 10 and 11 with the eddy current paths 28 with slits and 29 without slits).

One exemplary embodiment of the invention includes that the press plate laminates have the form of ring segments, that the slits run in the radial direction, that the slits, starting from an inner edge of the press plate laminates, extend into the interior of the press plate laminates and end there, and that all of the slits end at the same radius. However, the slits can also run outwards in a direction which deviates from the radial direction.

Providing slits from the outside in is not possible since
the yoke wedges (JK in FIG. 1) short-circuit the laminates, and
the maximum loss densities occur in the radially inner slot base region.

In particular, the slits end at the predetermined radius when holes for passing through clamping bolts are provided in the press plate laminates on a predetermined radius, by means of which clamping bolts the press plates are pressed against the laminated stator core in the axial direction. In this case, at least some of the slits can end in the holes for the clamping bolts.

Another exemplary configuration in accordance with the present invention includes slots, which reach radially into the laminate up to a predetermined depth, for accommodating the stator winding provided at least in some of the press plate laminates, distributed over the inner circumference, and that the slits each extend, starting from a slot base, into the interior of the press plate laminates.

In this case, the slits can start from the center of the slot base and form axially deep slits. However, they can also start from a point on the slot base which is laterally offset with respect to the center of the slot base. In this second case, the laminates of every second layer are provided with alternating offsets or the laminates of every second layer are turned. A slight overlap of the laminates is therefore achieved. This may be advantageous for reasons of mechanical robustness, but slightly higher eddy current losses result.

The slits are arranged distributed over the circumference. In this case, it is conceivable that a slit extends from each slot into the interior of the press plate laminate. However, it is also conceivable that a slit extends only from some of the slots, especially from every second slot, into the interior of the press plate laminate.

Another exemplary embodiment in accordance with the present invention includes slots, which reach radially into the laminate up to a predetermined depth, for accommodating a stator winding provided at least in some of the press plate laminates, distributed over the inner circumference, such that teeth remain between the slots, and that the slits each extend from an inner edge of the teeth through the teeth into the interior of the press plate laminates. The slits can run precisely in the center of the teeth. However, they can also be offset with respect to the center of the teeth, as described above.

Preferably, the press plates extend conically outwards at their inner circumference, and the conical extent is achieved by the press plate laminates being stepped back in layers or blocks.

In accordance with another configuration of the invention, the slits end centrally in the press plate laminate, and holes are arranged at the ends of the slits, which holes form axial cooling channels in the press plate.

Preferably, the slits have a slit width in the millimeters range, in particular in the range of between 0.3 and 1.0 mm, and are produced by a laser cutting process.

BRIEF DESCRIPTION OF THE DRAWINGS

The invention will be explained in more detail below with reference to exemplary embodiments in connection with the drawing, in which:

FIG. 3 shows, in two subfigures, a conventional press plate laminate in the form of a ring segment in accordance with the prior art (FIG. 3a) and the press plate laminates being stepped back in layers;

FIG. 4 shows, in an illustration comparable to that in FIG. 3, the press plate laminate (FIG. 4a) and the longitudinal section through the press plate (FIG. 4b) constructed therefrom, the press plate laminates being stepped back in blocks (block step 24);

DETAILED DESCRIPTION OF EXEMPLARY EMBODIMENTS

FIGS. 5 to 9 illustrate various exemplary embodiments for press plate laminates with slits according to principles of the present invention. These slits are preferably provided when the press plate laminates are lasered. The lasered slits 26 have a slit width in the millimeters range and are preferably 0.3 to 1.0 mm wide. The press plate laminates have a design which is known per se in terms of material and thickness as well as surface coating, in the same way as the laminates of the laminated stator core.

Figure 1:
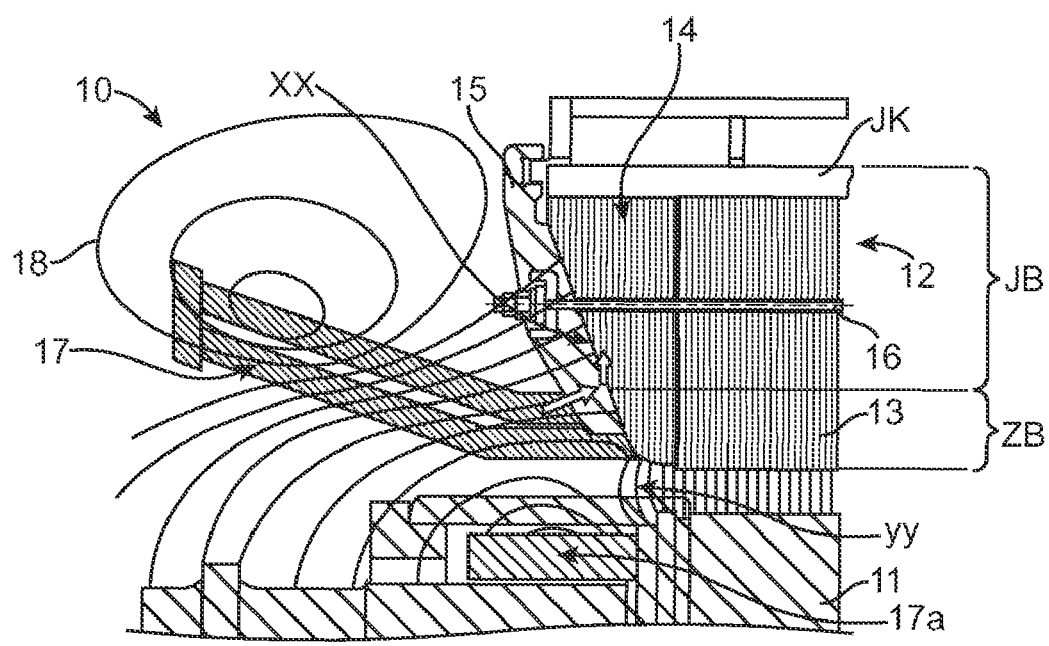
FIG. 1 shows a sectional illustration of the arrangement of a laminated press plate in a turbogenerator in accordance with the prior art.
Figure 2:
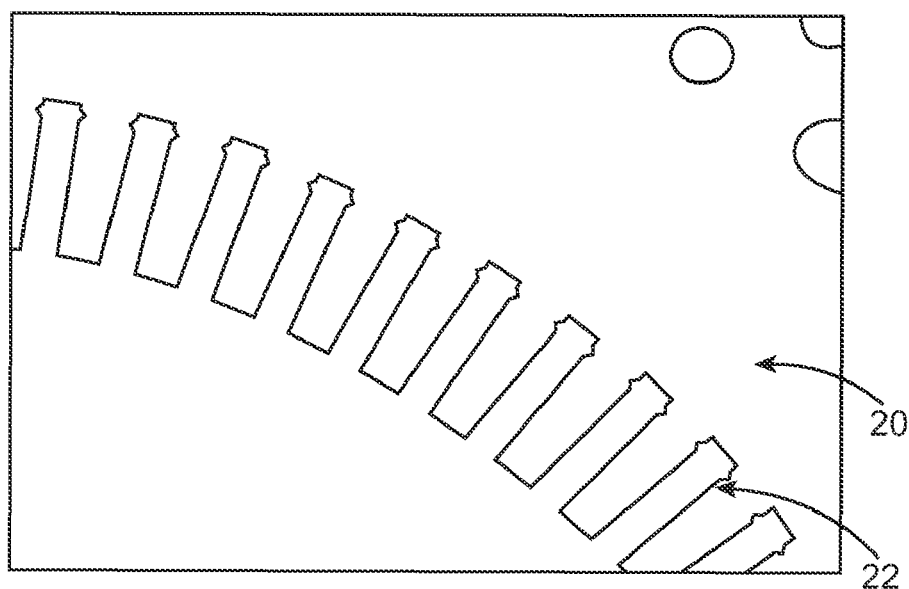
FIG. 2 shows an illustration of damage in a stator end part of the conventional type.
Figures 5A, 5B:
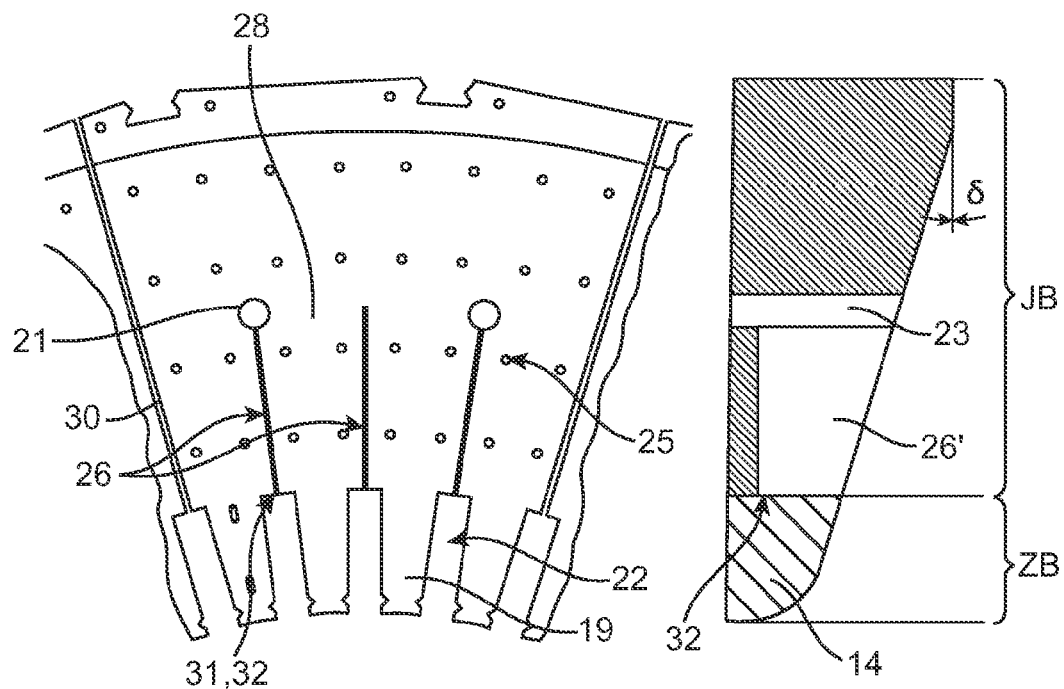
FIG. 5 shows, in two subfigures, a press plate laminate with slits in accordance with a first exemplary embodiment of the invention (FIG. 5a) and the longitudinal section through the press plate (FIG. 5b) constructed therefrom, the press plate laminates being stepped back in layers, and the slits emerging from each slot.

In the case of the press plate laminate 30 in accordance with the exemplary embodiment illustrated in FIG. 5, the slits 26, which run radially outwards from an inner edge 31 of the press plate laminate 30, in this case from the center of the slot base 32 of each slot 22, all end on a common radius, which fixes the center of the holes 21 intended for the clamping bolts and is in the center of the yoke region (JB in FIG. 1). In the axial direction, a continuous slit 26' having a constant radial extent results in the press plate 14 (FIG. 5b).

Figures 6, 7:
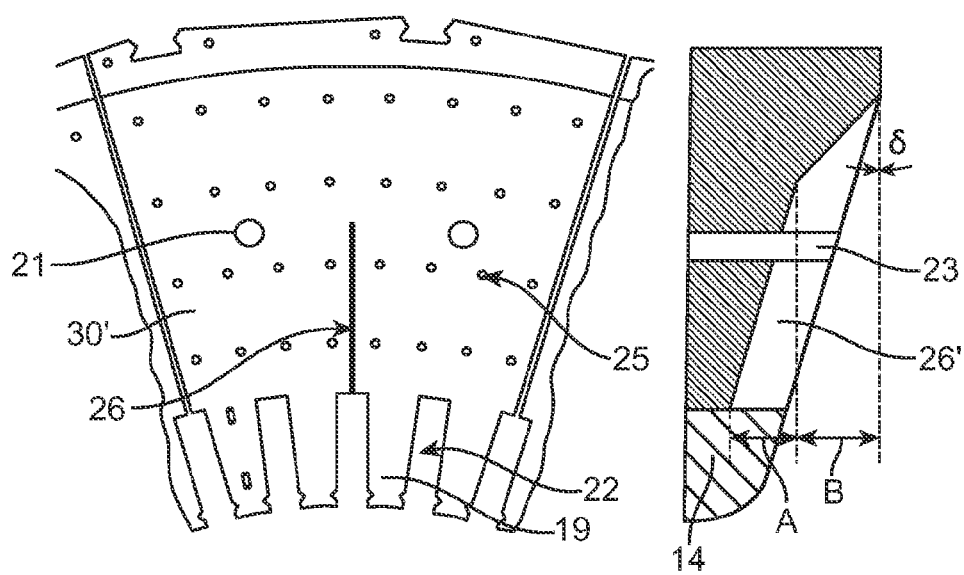
FIG. 6 shows, in an illustration comparable to that in FIG. 5b, the longitudinal section through a press plate in accordance with a second exemplary embodiment of the invention, the press plate laminates being stepped back in layers, and the lengths of the slits changing with the laminate layer.
FIG. 7 shows, in an illustration comparable to that in FIG. 5a, a press plate laminate in accordance with a third exemplary embodiment of the invention, the slits only emerging from every second slot.

In the exemplary embodiment in FIG. 6, the radial extent of the slit 26 varies with the layer of the press plate laminate. The slit end is in this case in a first region A on a parallel line with respect to the press plate cone and, in a second region B, moving towards the cone edge.

In the exemplary embodiment shown in FIG. 7, the press plate laminate 30' only has slits in every second slot base 32. In the example, only one slit 26 per laminate then results owing to the segmentation of the press plate laminates 30'. In this case, if necessary, the teeth 19 may be provided with slits so as to be of assistance in a known manner.

Figure 8:
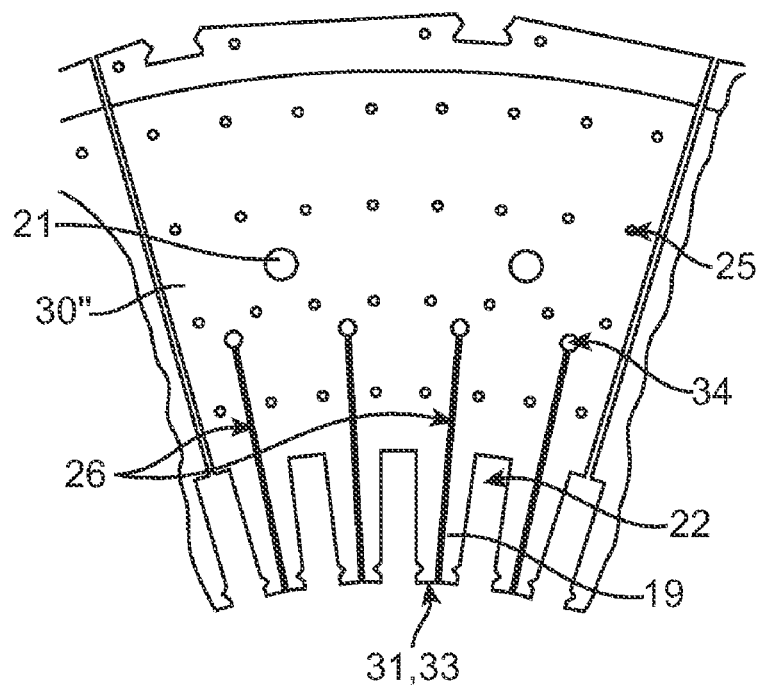
FIG. 8 shows, in an illustration comparable to that in FIG. 5a, a press plate laminate in accordance with a fourth exemplary embodiment of the invention, the slits running in the teeth and ending centrally in the press plate laminate.

In the exemplary embodiment shown in FIG. 8, the press plate laminate 30" is provided with slits in the center of the teeth 19, i.e. the inner edge 31 of the press plate laminate 30', from where the slits 26 start, is in each case the inner edge 33 of the teeth 19, here. The depth of the slits 26 goes beyond the tooth region. A favorable combination of the known tooth slits with the yoke slits according to the invention results.

Figure 9:
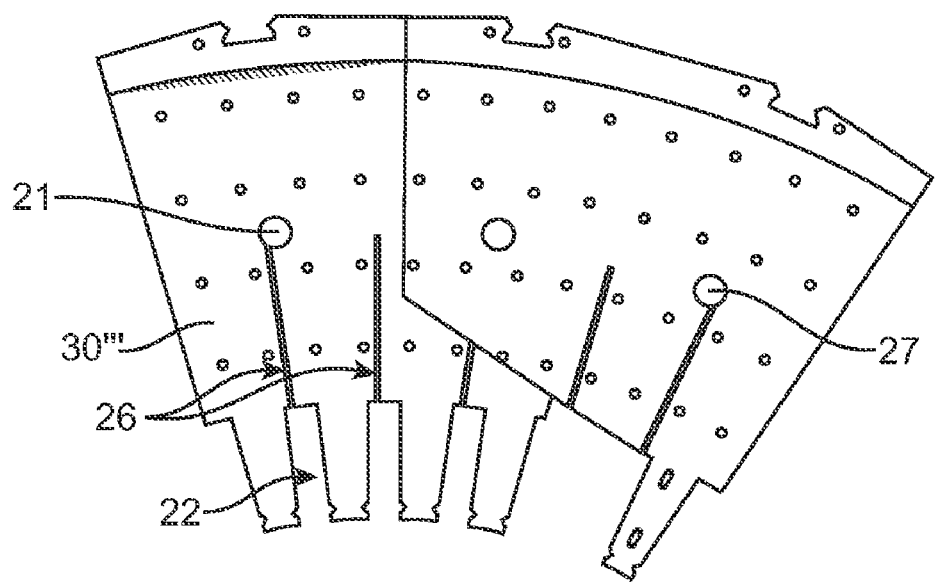
FIG. 9 shows, in an illustration comparable to that in FIG. 5a, two press plate laminates in accordance with a fifth exemplary embodiment of the invention, the slits, starting from the slot base, being arranged such that they are laterally offset with respect to the center of the slot base, and press plate laminates of successive layers being installed such that they are turned in relation to one another, with the result that the slits of the press plate laminates are not aligned.

In the exemplary embodiment shown in FIG. 9, the slits 26 are offset from the center of the slot base 32. By turning the press plate laminates 30''' of every second layer, overlapping results which increases the mechanical robustness, together with the described adhesive bonding. However, a slight increase in the losses for the axial components also results.

If the slits 26 do not in any case end in holes (such as the holes 21, for example), circular cutouts (by way of example: holes 34 in FIG. 8) can be formed at the end of the slits 26 for reducing the concentration of losses and concentration of mechanical stress. The circular cutouts, and also the slits, can be used (in the case of a central arrangement) for cooling purposes (as axial cooling channels).

Figure 12:
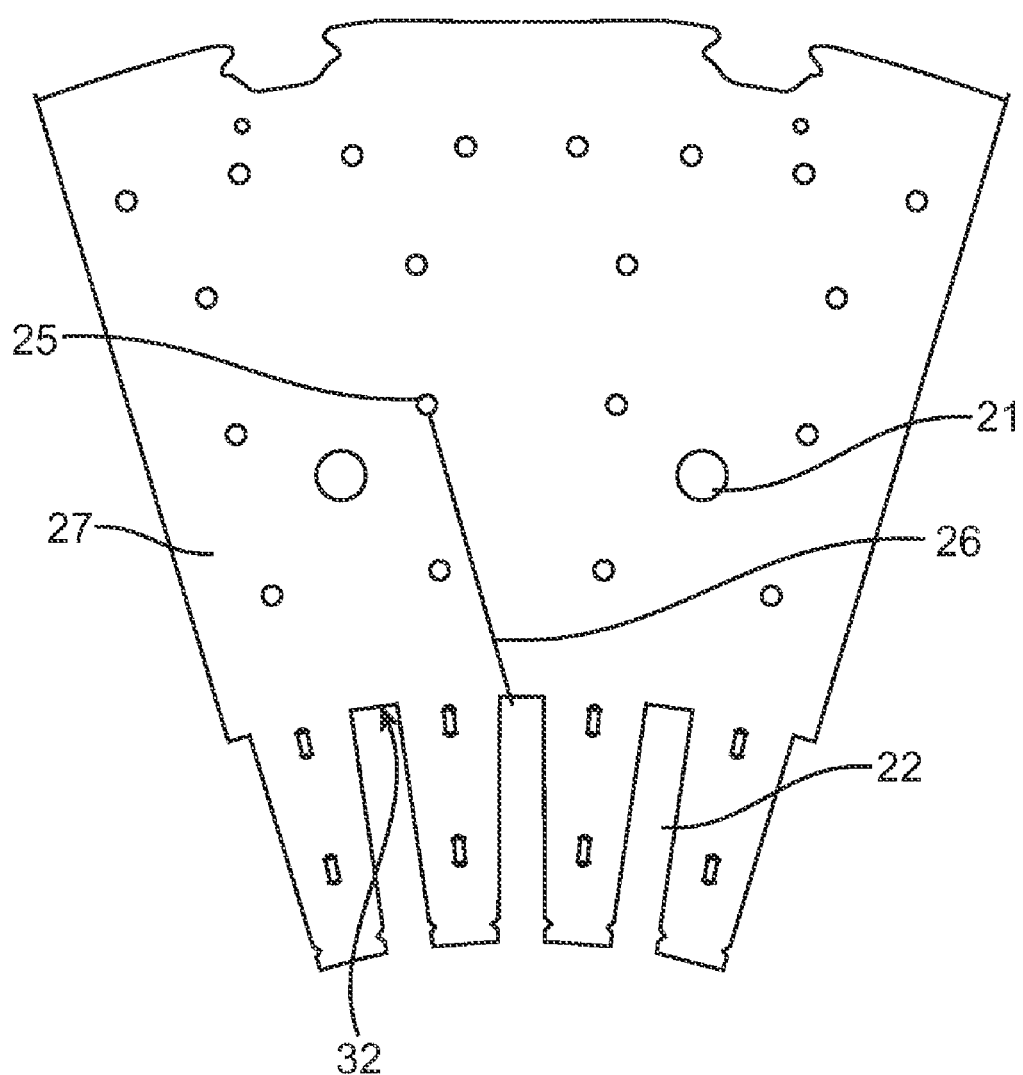
FIG. 12 shows a press plate laminate having a slit, which extends, starting from the slot base, into the interior of the press plate laminate in a direction which deviates from the radial direction.

One further exemplary embodiment of the invention is reproduced in FIG. 12. In this example, slits 26 are used in the press plate laminate 27 which deviate in terms of their direction from the radial direction. In the illustrated case in FIG. 12, the slit starts from the slot base 32 outside the center and ends in one of the holes 25, which are used as cooling channels, for example. In this case, too, the slits of different layers of press plate laminates 27 can be arranged such that they are offset with respect to one another.

The effect of the slits 26 on the eddy current losses can be estimated as follows (FIGS. 10, 11):

The losses arise in accordance with $$P_{eddy} = (U^2/R_{eddy\ current\ path}) * n_{eddy}$$

Figure 10:
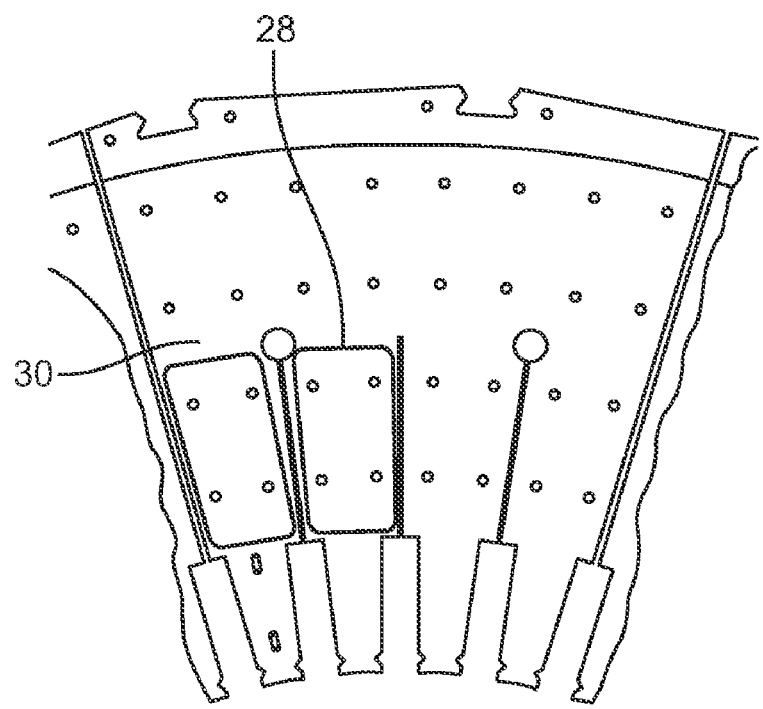
FIG. 10 shows exemplary eddy current paths in a press plate laminate with slits according to the invention.
Figure 11:
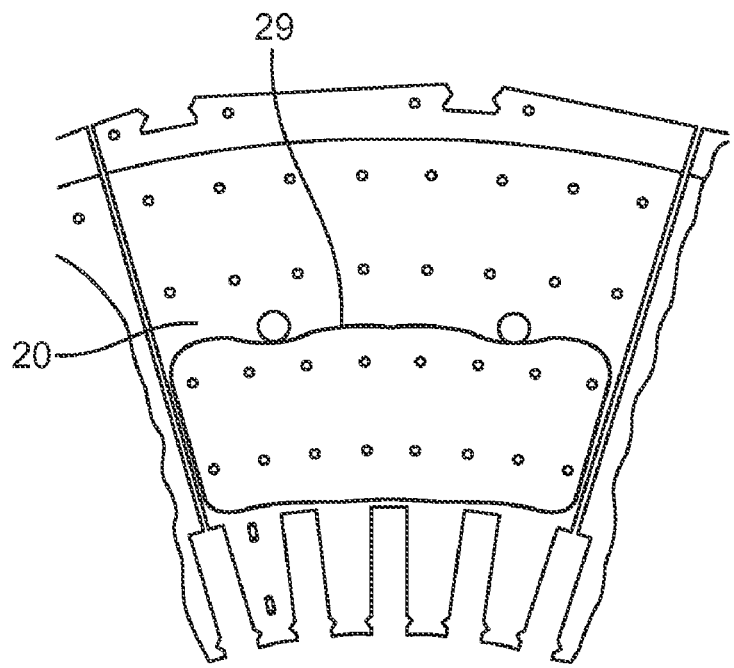
FIG. 11 shows comparable eddy current paths in a press plate laminate without slits according to the prior art.

$P_{eddy}$ = eddy current power loss
U = electromotive force
$R_{eddy\ current\ path}$ = resistance of the eddy current path
$n_{eddy}$ = number of eddies Using the example of the configurations in FIGS. 10 and 11, the following results (comparing all values in per unit (pu) units):

Without slits (FIG. 11): $P_{eddy} \approx (1^2/1)*1 = 1$ pu
With slits (FIG. 10): $P_{eddy} \approx (0.25^2/0.5)*4 = 0.5$ pu With slits being provided in the press plates 30 illustrated in FIG. 10, four times the number of eddy current paths 28 are produced in comparison with the eddy current paths 29 of a press plate laminate 20 without slits (cf. FIG. 11). In this case, the electromotive force of the eddy current paths 28 is now only ¼ of the corresponding voltage, and the length of the eddy current paths 28 is in each case only approximately 50% of the length of the eddy current paths 29 of a press plate laminate 20 without slits.

In total, therefore, now only 50% of the losses without slits are present.

LIST OF REFERENCE SYMBOLS 10 rotating electrical machine (turbogenerator)
11 rotor
12 stator
13 laminated stator core
14, 14' press plate (laminated)
15 press finger
16 clamping bolt
17 stator end winding
17a rotor end winding
18 line of force
19 tooth
20 press plate laminate
21 hole (clamping bolt)
22 slot
23 bore (clamping bolt)
24 block step
25 hole (axial cooling channel)
26, 26' slit
27 press plate laminate (oblique slit)
28, 29 eddy current path
30, 30', 30", 30''' press plate laminate (with slits)
31 inner edge of 30, 30', 30", 30'''
32 slot base of 22
33 inner edge of 19
JB yoke region
JK yoke wedge
ZB tooth region
A,B region
xx,yy flux (magnetic)
δ cone angle While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A rotating electrical machine comprising:
   a rotor;
   a stator which concentrically surrounds the rotor and has a laminated press plate and a laminated stator core terminated at each of two axial ends by the laminated press plate, the laminated press plate comprising a stack of individual press plate laminates;
   wherein the press plate laminates at least partially comprise slits configured and arranged to reduce eddy current losses;
   wherein the press plate laminates comprise ring segments, and wherein the slits run in the radial direction;
   wherein the press plate laminates include an inner edge, and wherein the slits, starting from the inner edge of the press plate laminates, extend into the interior of the press plate laminates and end therein;
   slots which reach radially into the laminate up to a predetermined depth, configured and arranged to accommodate a stator winding, positioned in some of the press plate laminates, each slot having a slot base, the slots distributed over the press plate laminate inner circumference, and wherein the slits each extend, starting from a slot base, into the interior of the press plate laminates;
   wherein a slit extends from each slot into the interior of the press plate laminate.

2. The machine as claimed in claim 1, wherein the press plate laminates comprise ring segments, and wherein the slits run in a direction which deviates from the radial direction.

3. The machine as claimed in claim 2, wherein the press plate laminates include an inner edge, and wherein the slits, starting from the inner edge of the press plate laminates, extend into the interior of the press plate laminates and end therein.

4. The machine as claimed in claim 1, wherein all of the slits end at the same radius.

5. The machine as claimed in claim 4, further comprising:
   holes configured and arranged for passing through clamping bolts in the press plate laminates on a predetermined radius, and wherein the slits end at the predetermined radius.

6. The machine as claimed in claim 5, wherein at least some of the slits end in the holes for the clamping bolts.

7. The machine as claimed in claim 5, further comprising:
   clamping bolts passing through said holes in the press plate laminates, the clamping bolts axially pressing the press plates against the laminated stator core.

8. The machine as claimed in claim 1, wherein the slits start from the center of the slot base.

9. The machine as claimed in claim 1, wherein the slits start from a point on the slot base which is laterally offset with respect to the center of the slot base.

10. The machine as claimed in claim 1, further comprising:
    slots which reach radially into the laminate up to a predetermined depth, configured and arranged to accommodate a stator winding, positioned at least in some of the press plate laminates, the slots distributed over the press plate laminates inner circumference, the slots configured and arranged such that teeth remain between the slots, each tooth having an inner edge, and wherein the slits each extend from said inner edges of the teeth through the teeth into the interior of the press plate laminates.

11. The machine as claimed in claim 10, wherein the slits run precisely in the center of the teeth.

12. The machine as claimed in claim 10, wherein the slits run, from the center of the teeth, such that they are circumferentially offset.

13. The machine as claimed in claim 1, wherein the press plate laminates are stepped back in layers or blocks so that the press plates extend conically outwards at their inner circumference.

14. The machine as claimed in claim 1, wherein the slits of press plate laminates which lie one above the other are aligned and form slits which pass into the press plate in the axial direction.

15. The machine as claimed in claim 1, wherein the slits of press plate laminates which lie one above the other are offset with respect to one another in the circumferential direction of the press plate.

16. The machine as claimed in claim 15, wherein the offset of the slits of press plate laminates which lie one above the other is formed by changing the position of the press plate laminates in layers, by turning in layers press plate laminates with eccentric slits, or by both.

17. The machine as claimed in claim 1, wherein the slits end centrally in the press plate laminate, and further comprising:
    holes arranged at the ends of the slits.

18. The machine as claimed in claim 17, wherein the holes form axial cooling channels in the press plate.

19. The machine as claimed in claim 1, wherein the slits have a width in the range of between 0.3 and 1.0 mm.

20. The machine as claimed in claim 1, wherein the slits are produced by a laser cutting process.

21. The machine as claimed in claim 1, comprising a turbogenerator.

22. The machine as claimed in claim 1, wherein a slit extends only from every second slot into the interior of the press plate laminate.

23. A rotating electrical machine comprising:
    a rotor;
    a stator which concentrically surrounds the rotor and has a laminated press plate and a laminated stator core terminated at each of two axial ends by the laminated press plate, the laminated press plate comprising a stack of individual press plate laminates;
    wherein the press plate laminates at least partially comprise slits configured and arranged to reduce eddy current losses;
    wherein the press plate laminates comprise ring segments, and wherein the slits run in the radial direction;
    wherein the press plate laminates include an inner edge, and wherein the slits, starting from the inner edge of the press plate laminates, extend into the interior of the press plate laminates and end therein;

slots which reach radially into the laminate up to a predetermined depth, configured and arranged to accommodate a stator winding, positioned in some of the press plate laminates, each slot having a slot base, the slots distributed over the press plate laminate inner circumference, and wherein the slits each extend, starting from a slot base, into the interior of the press plate laminates;

wherein a slit extends only from some of the slots into the interior of the press plate laminate.

24. A rotating electrical machine comprising:

a rotor;

a stator which concentrically surrounds the rotor and has a laminated press plate and a laminated stator core terminated at each of two axial ends by the laminated press plate, the laminated press plate comprising a stack of individual press plate laminates;

wherein the press plate laminates at least partially comprise slits configured and arranged to reduce eddy current losses, wherein the radial lengths of the slits are different in adjacent laminate layers, so that radially outer ends of slits in a first set of laminates lie along a first cone, and radially outer ends of slits in a second set of laminates lie along a second cone.

* * * * *